United States Patent
Cromer et al.

(10) Patent No.: US 6,628,663 B1
(45) Date of Patent: Sep. 30, 2003

(54) SYSTEM AND METHOD FOR PERMITTING A DUMB DEVICE TO CREATE AND TRANSMIT NETWORK PACKETS

(75) Inventors: Daryl Carvis Cromer, Cary, NC (US); Dhruv M. Desai, Cary, NC (US); Brandon Jon Ellison, Raleigh, NC (US); Howard Locker, Cary, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/206,014

(22) Filed: Dec. 4, 1998

(51) Int. Cl.⁷ .................................. H04L 12/66
(52) U.S. Cl. .................. 370/463; 379/475; 379/476; 709/227
(58) Field of Search ................... 370/463, 420, 370/230, 389, 392, 401, 475, 476; 709/224, 223, 250, 218, 227, 313

(56) References Cited

U.S. PATENT DOCUMENTS

| | | | | |
|---|---|---|---|---|
| 4,949,299 A | * | 8/1990 | Pickett ..................... | 710/105 |
| 5,648,966 A | * | 7/1997 | Kondo et al. ............... | 370/245 |
| 5,995,916 A | * | 11/1999 | Nixon et al. ................ | 702/182 |
| 6,266,696 B1 | * | 7/2001 | Cromer et al. ............. | 709/224 |

* cited by examiner

Primary Examiner—Seema S. Rao
Assistant Examiner—Alexander O. Boakye
(74) Attorney, Agent, or Firm—Bracewell & Patterson LLP (57) ABSTRACT

A method and system are described for permitting a dumb device having no operating system to create and transmit a network packet utilizing a network. The dumb device is coupled to a client computer system utilizing the network. A network interface is established within the dumb device. In response to an event, the dumb device generates an internal output signal. The output signal is received within the dumb device by the network interface. In response to a receipt of the output signal, the network interface creates and transmits a network packet including an indication of the event to the client computer system, wherein a dumb device having no operating system creates and transmits a network packet.

3 Claims, 9 Drawing Sheets

SYSTEM AND METHOD FOR PERMITTING A DUMB DEVICE TO CREATE AND TRANSMIT NETWORK PACKETS

CROSS-REFERENCE TO RELATED APPLICATIONS

The present invention is related to the subject matter of patent application Ser. NO. 09/024,231 U.S. Pat. No. 6,266,696 entitled "FULL TIME NETWORK AUXILIARY PROCESSOR FOR A NETWORK CONNECTED PC" filed on Feb. 17, 1998, assigned to the assignee herein named, and incorporated herein by reference.

BACKGROUND OF THE INVENTION

1. Field of the Invention

The present invention relates in general to data processing systems and, in particular, to a system and method for establishing a network interface within a dumb device. Still more particularly, the present invention relates to a system and method for permitting a non programmable device ("dumb device") to generate and transmit a network packet to a server computer system utilizing a network.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface. One of the distinguishing characteristics of these systems is the use of a motherboard or system planar to electrically connect these components together. Examples of such personal computer systems are IBM's PC series, Aptiva series, and Thinkpad series.

With PCs being increasingly connected into networks to allow transfers of data among computers to occur, more operations such as maintenance, updating of applications, and data collections are occurring over-the network. Computer networks are also becoming essential to their user. It is desirable minimize loss of productivity by increasing availability of network resources. In today's network world, the availability and performance of the network is as important as the availability and performance of the personal computer.

Security is a major concern for all companies. These companies have invested in a security infrastructure to reduce theft, limit access, and protect workers. The type of security varies from a guard to a type of electronic surveillance. The electronic surveillance is typically a CCTV tape or an Electronic Article Surveillance (EAS) and sensor. The methods of electronic surveillance can provide invaluable information regarding the precise time of a security breach to security personnel and law enforcement.

One major problem with many security mechanisms is that they are of a stand-alone nature. For example, an entry or exit alarm may sound or trigger a display on a monitor station. However, that alarm will not notify the security personnel to monitor the CCTV display screen.

Therefore a need exists for a system and method for establishing a network interface within a dumb device so that the dumb device may generate and transmit network packets.

SUMMARY OF THE INVENTION

A method and system are described for permitting a dumb device having no operating system to create and transmit a network packet utilizing a network. The dumb device is coupled to a client computer system utilizing the network. A network interface is established within the dumb device. In response to an event, the dumb device generates an internal output signal. The output signal is received within the dumb device by the network interface. In response to a receipt of the output, the network interface creates and transmits a network packet including an indication of the event to the client computer system, wherein a dumb device having no operating system creates and transmits a network packet.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DESCRIPTION OF A PREFERRED EMBODIMENT

A preferred embodiment of the present invention and its advantages are better understood by referring to FIGS. 1–9 of the drawings, like numerals being used for like and corresponding parts of the accompanying drawings.

The present invention is a method and system for permitting a dumb device having no operating system to create and transmit network packets. The dumb device includes a network interface. The network interface includes a special purpose processing unit, a network controller, a storage device, a power supply, and a physical connector.

The special purpose processing unit receives internal output signals from dumb device utilizing a plurality of general purpose input pins. When an output is received, the special purpose processing unit determines a command associated with the output. The special purpose processing unit then creates a network packet including the appropriate headers as well as the determined command. The network headers include a network address preferably for a server computer system. The special purpose processing unit then sends the network packet it created to the network controller which then transmits the packet.

The server computer system receives the network packet utilizing the network. Upon the receipt of the packet, the server will take a predetermined action. For example, the packet may be generated in response to an output from the dumb device indicating that a door has been opened. The server may then direct the dumb device to close the door. Therefore, the command included within the packet will be a command to close the door. When the dumb device receives this packet, the device causes the door to be closed.

Figure 1:
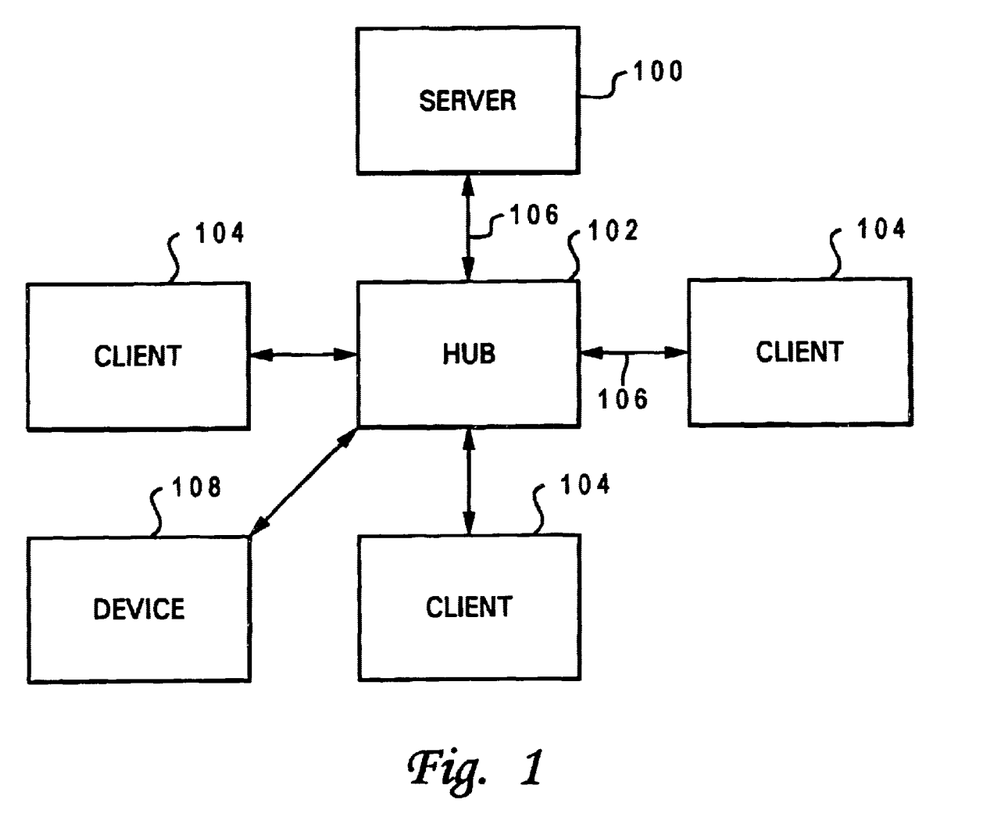
FIG. 1 illustrates a pictorial representation of a data processing system including a dumb device and a plurality of client computer systems coupled to a server computer system utilizing a network and a hub in accordance with the method and system of the present invention.

FIG. 1 illustrates a pictorial representation of a data processing system including a dumb device and a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks, such as token ring, may be utilized to implement the invention.

The term "network" includes any type of data communications channel, such as an Ethernet network, token ring, or X.10 or X.25. Those skilled in the art will recognize that the invention described herein may be implemented utilizing any type of data communications channel. However, the preferred embodiment is implemented utilizing an Ethernet network.

Dumb device 108 is any type of device capable of generating an internal output signal and which includes no operating system. For example, dumb device 108 may include a door monitor, portal gates, or over-temp sensor, flow monitor, event counter, or vending machine empty. Dumb device 108 must be capable of generating an internal output signal which is received internally within dumb device 108 on a plurality of general purpose input pins.

Figure 2:
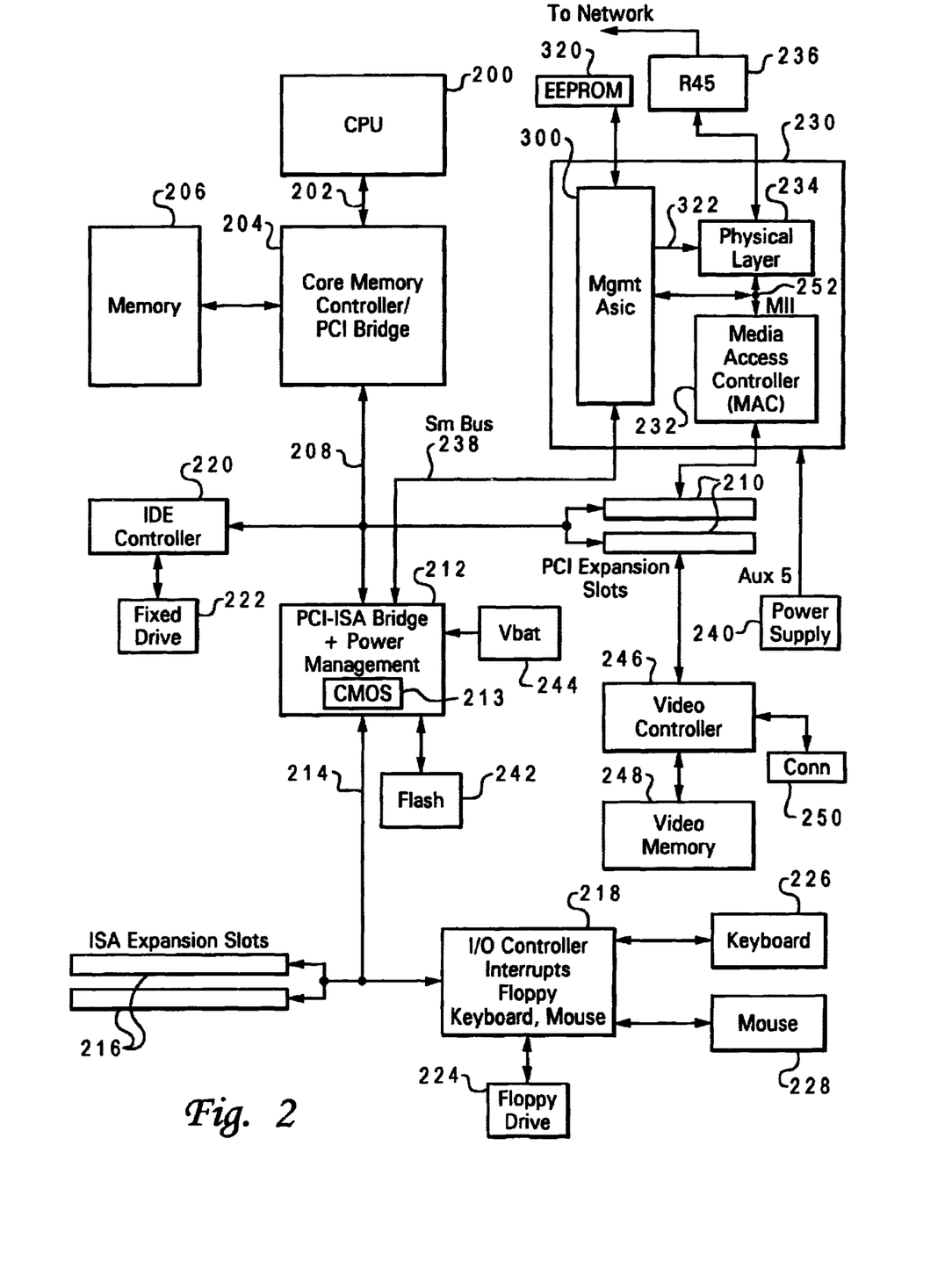
FIG. 2 depicts a pictorial representation of a network interface included within a client computer system in accordance with the method and system of the present invention.

FIG. 2 depicts a pictorial representation of a network interface included within a client computer system in accordance with the method and system of the present invention. A central processing unit (CPU) 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes microcode which client 104 executes upon power-on. Flash memory 242 is an electrically erasable programmable read only memory (EEPROM) module and includes BIOS that is used to interface between the I/O devices and operating system. PCI-ISA bridge controller 212 also includes storage 213, which is preferably implemented utilizing CMOS storage, that holds the BIOS settings. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 204 is supplied power from battery 244 to prevent loss of configuration data in storage 213.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network interface 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a power supply 240 which supplies full normal system power, and has an auxiliary power main AUX 5 which supplies full time power to the power management logic 212 and to the network interface 230. This enables client 104 to respond to a wakeup signal from network interface 230. In response to a receipt of the wakeup signal, power supply 240 is turned on and then powers up client 104.

Network interface 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network interface 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server 100. Third, it establishes a connection with server computer 100 using the highest performance connection technology.

Network interface 230 includes a special purpose processor, or logic module, 300 coupled to the MII bus 252 between physical layer 234 and MAC 232. Special purpose processor 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

Data from client computer system 104 is accessed by ASIC 300 over a system management bus (SM) 238. System management bus 238 is a two-wire, low-speed serial bus used to interconnect management and monitoring devices. With the trickle power supplied by signal AUX 5 from power supply 240, ASIC 300 is preferably powered full time.

Figure 3:
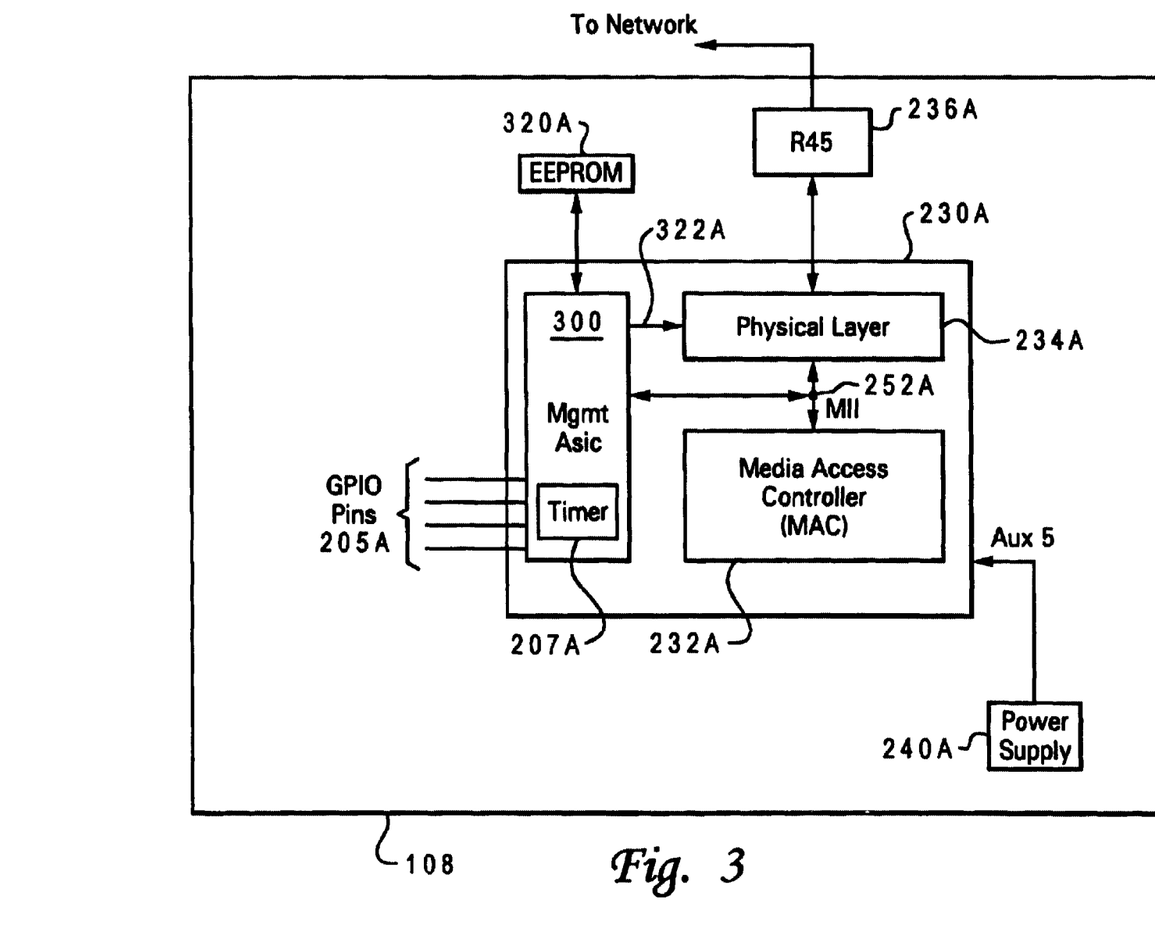
FIG. 3 illustrates a pictorial representation of a network interface which is established and included within a dumb device in accordance with the method and system of the present invention.

FIG. 3 illustrates a pictorial representation of a network interface which is established and included within a dumb device in accordance with the method and system of the present invention. Dumb device 108 includes a network interface 230A, a power supply 240A, a storage device such as EEPROM 320A, and connector 236A. Network interface 230A, power supply 240A, EEPROM 320A, and connector 236A act in a manner similar to that described above.

When device 108 is powered-on, initialization settings stored EEPROM 320A are utilized by micro-controller 302A are utilized to initialize device 108 on to the network. In this manner, device 108 does not require an operating system executing within device 108 in order to transmit/receive network packets.

Special purpose processing unit 300A may be a "hard wired" application specific integrated circuit (ASIC) or a programmed general-purpose processor which is programmed as more fully described below. By coupling ASIC 300A to MII bus 252A, ASIC 300A may send and receive network packets using physical layer 234A.

ASIC 300A includes a plurality of timers 207A and a plurality of general purpose input pins 205A. Within dumb device 108, output signals are generated which are received within dumb device 108 by ASIC 300A utilizing pins 205A. In response to an input on pins 205A, ASIC 300A determines a command which is associated with the received output signal. ASIC 300A then creates a network packet including a network header including the network address of the client computer system. The network packet created by ASIC 300A also includes a data packet which includes the command associated with the received output. ASIC 300A then sends the network packet to the network controller 232A. Network controller 232A then transmits the packet over the network utilizing physical layer 234A and connector 236A.

Figure 4:
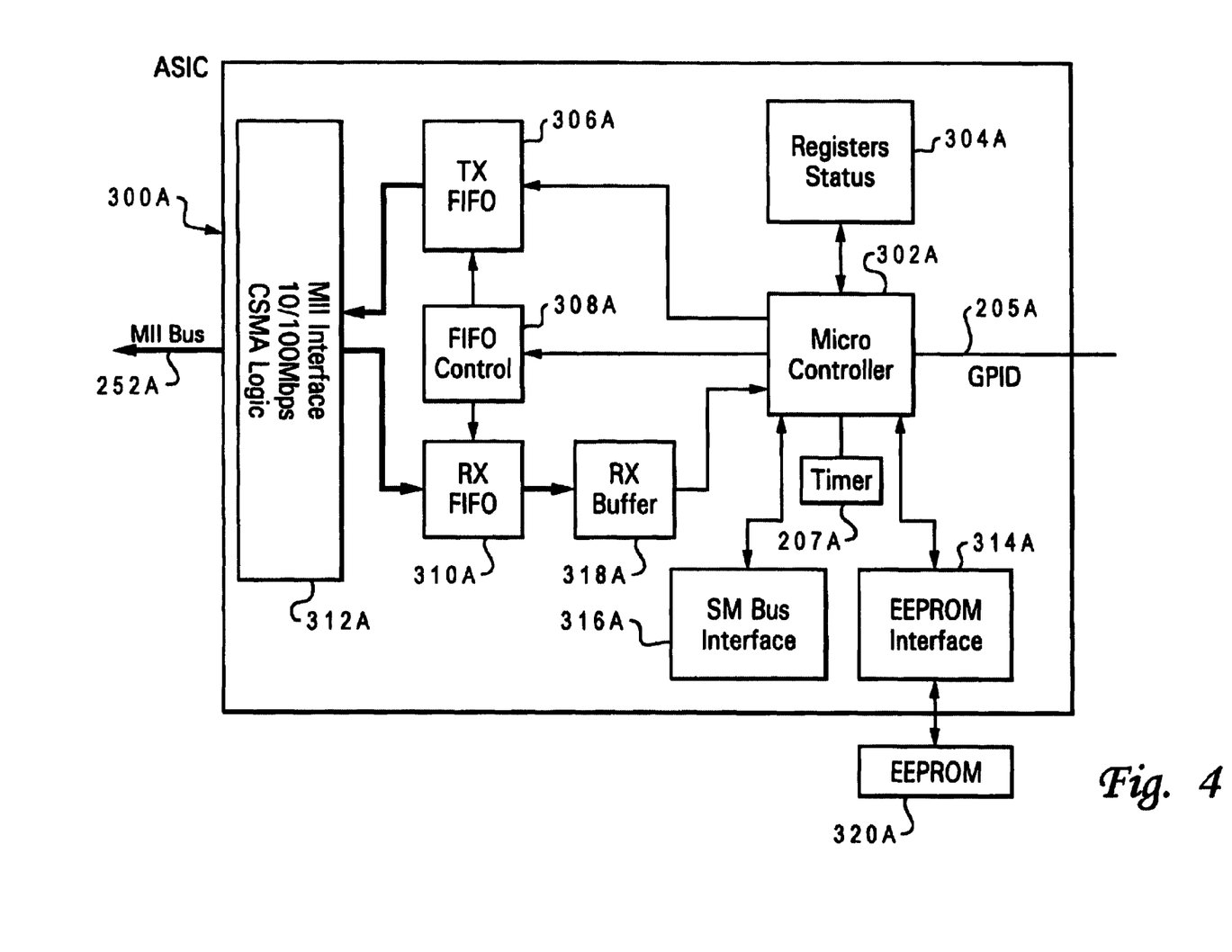
FIG. 4 depicts a pictorial representation of a special purpose processing unit which is included within a network interface within a dumb device in accordance with the method and system of the present invention.

FIG. 4 depicts a pictorial representation of a special purpose processing unit which is included within a network interface within a dumb device in accordance with the method and system of the present invention. ASIC 300A includes a micro-controller 302A which includes several state machines to handle the following tasks: packet reception, SM bus interface, and EEPROM updates. Micro-controller 302A sends commands to FIFO control 308A to control data flow from TX FIFO 306A, RX FIFO 310A, and RX Buffer 318A.

Micro-controller 302A is coupled to timer 207A and includes a general purpose input/output signals 205A. Micro-controller 302A accesses EEPROM 320A through EEPROM interface 314A to obtain values to create network packets such as source and destination MAC addresses, IP protocol information, authentication headers, and Universal Data Packet headers. Further, EEPROM 320A retains the Universal Unique Identifier (UUID).

Figure 5A:
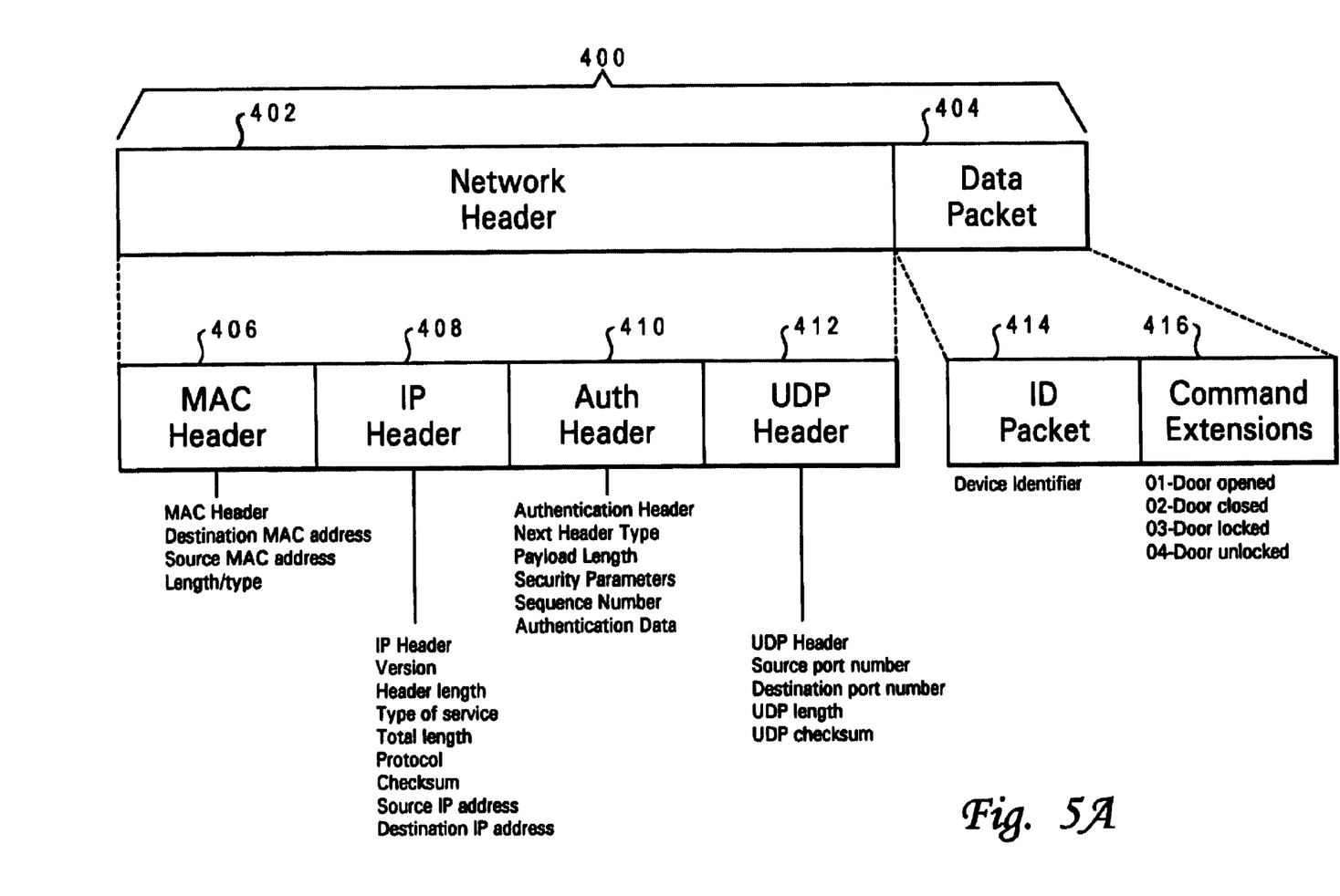
FIG. 5A illustrates a pictorial representation of a network packet, including a network header and a data packet, which may be transmitted by a dumb device over the network to a server computer system in accordance with the method and system of the present invention.

FIG. 5A illustrates a pictorial representation of a network packet, including a network header and a data packet, which may be transmitted by a dumb device over the network in accordance with the method and system of the present invention. Each network packet 400 includes a network header packet 402 and a data packet 404.

Network header 402 includes a MAC header 406, IP header 408, authentication header 410, and UDP header 412 which are all known in the art to provide addresses, identifiers, and other information for assuring correct transfer of the packet. Data packet 404 includes the information content to be transferred.

Data packet 404 includes an identifier packet 414 and command extensions 416. Identifier packet 414 include a device identifier which identifies the particular dumb device which created this packet. Command extensions 416 includes any suitable type of command to indicate to server 100 the current status of the device being monitored by dumb device 108. For example, if dumb device 108 is monitoring the status of a door, command extensions may include a door opened, door closed, door locked, or door unlocked command.

Figure 5B:
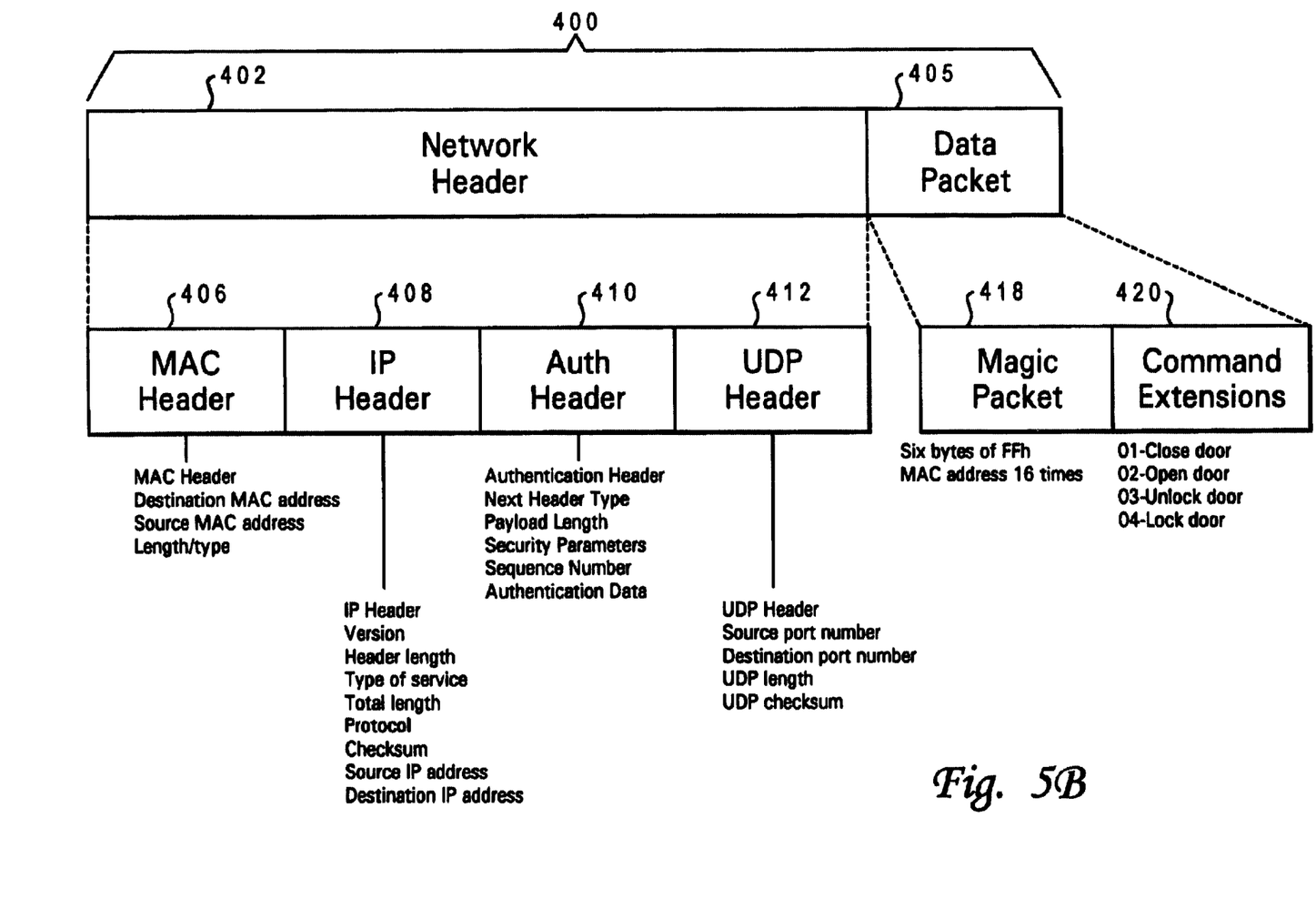
FIG. 5B depicts a pictorial representation of a network packet, including a network header and a data packet, which may be transmitted by a server computer system over the network to a dumb device in accordance with the method and system of the present invention.

FIG. 5B depicts a pictorial representation of a network packet, including a network header and a data packet, which may be transmitted by a server computer system over the network in accordance with the method and system of the present invention. Each network packet 400 includes a network header packet 402 and a data packet 404 as described above.

Data packet 405 includes a magic packet 418 and one of the commands 420. The content of Magic packet 418 is six bytes of "FF" followed by 12 copies of the destination's MAC addresses. Magic packet 418 is a specialized type of packet. Magic packet 418 is a management packet which does not include standard network data. When magic packet 418 is detected utilizing the six bytes of "FF", MAC 232A will ignore magic packet 418.

Commands 420 include commands directing device 108 to take an appropriate action. For example, if dumb device 108 is a door monitor, the command to cause the door to close, open, be unlocked, or be locked.

Figure 6:
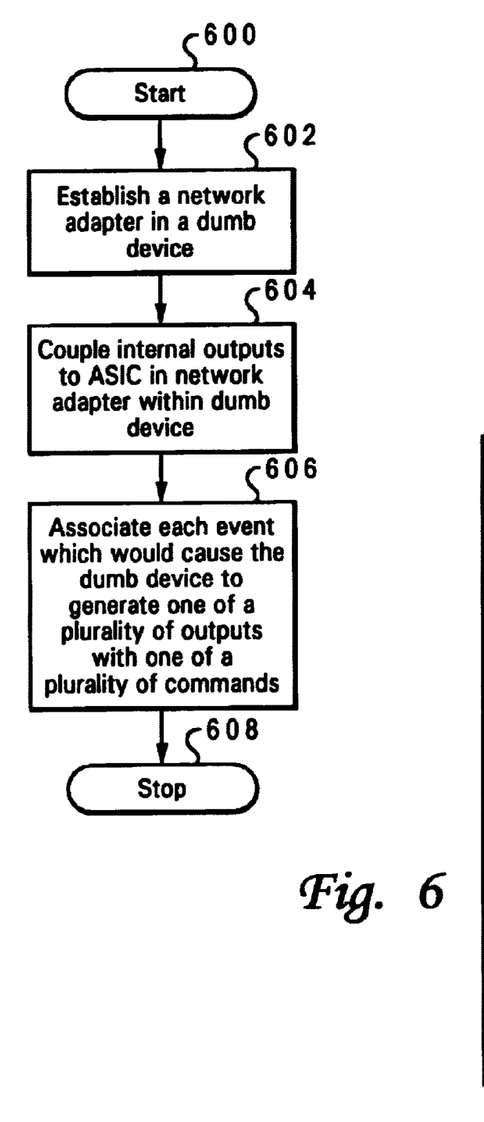
FIG. 6 illustrates a high level flow chart which depicts establishing a network interface within a dumb device in accordance with the method and system of the present invention.

FIG. 6 illustrates a high level flow chart which depicts establishing a network interface within a dumb device in accordance with the method and system of the present invention. The process starts as depicted by block 600 and thereafter passes to block 602 which illustrates the establishment of a network interface in a dumb device having no operating system. Next, block 604 depicts the coupling of the outputs to ASIC 300A in network interface 230A within dumb device 108. Thereafter, block 606 illustrates the association of each event which would cause the dumb device to generate an output with one of a plurality of commands. The process then terminates as depicted by block 608.

Figure 7:
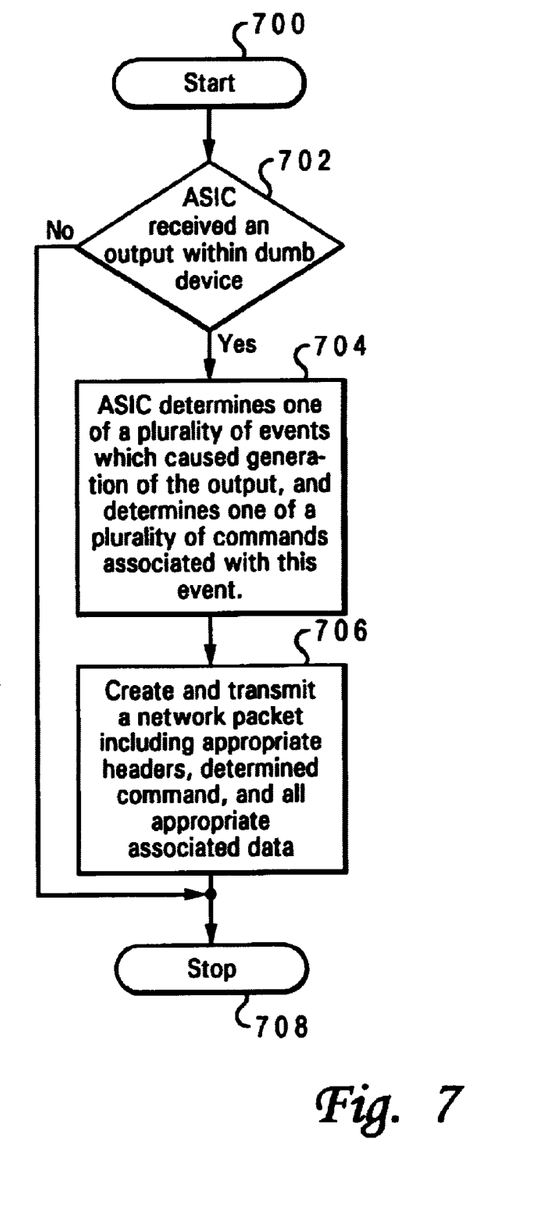
FIG. 7 illustrates a high level flow chart which depicts a dumb device creating and transmitting a network packet via a network in accordance with the present invention.

FIG. 7 illustrates a high level flow chart which depicts a dumb device creating and transmitting a network packet via a network in accordance with the present invention. The process starts as depicted by block 700 and thereafter passes to block 702 which illustrates a determination of whether or not ASIC 300A received an output within the dumb device. If a determination is made that ASIC 300A did not receive an output within the dumb device, the process terminates as depicted by block 708.

Referring again to block 702, if a determination is made that ASIC 300A did receive an output within the dumb device, the process passes to block 704 which illustrates ASIC 300A determining one of a plurality of events which caused the generation of this output, and determining one of a plurality of commands associated with this event. Next, block 706 depicts ASIC 300A creating and network interface 230A transmitting a network packet including the determined associated command. The network packet includes the destination headers as well as any and all necessary data associated with the event. The process then terminates as illustrated by block 708.

Figure 8:
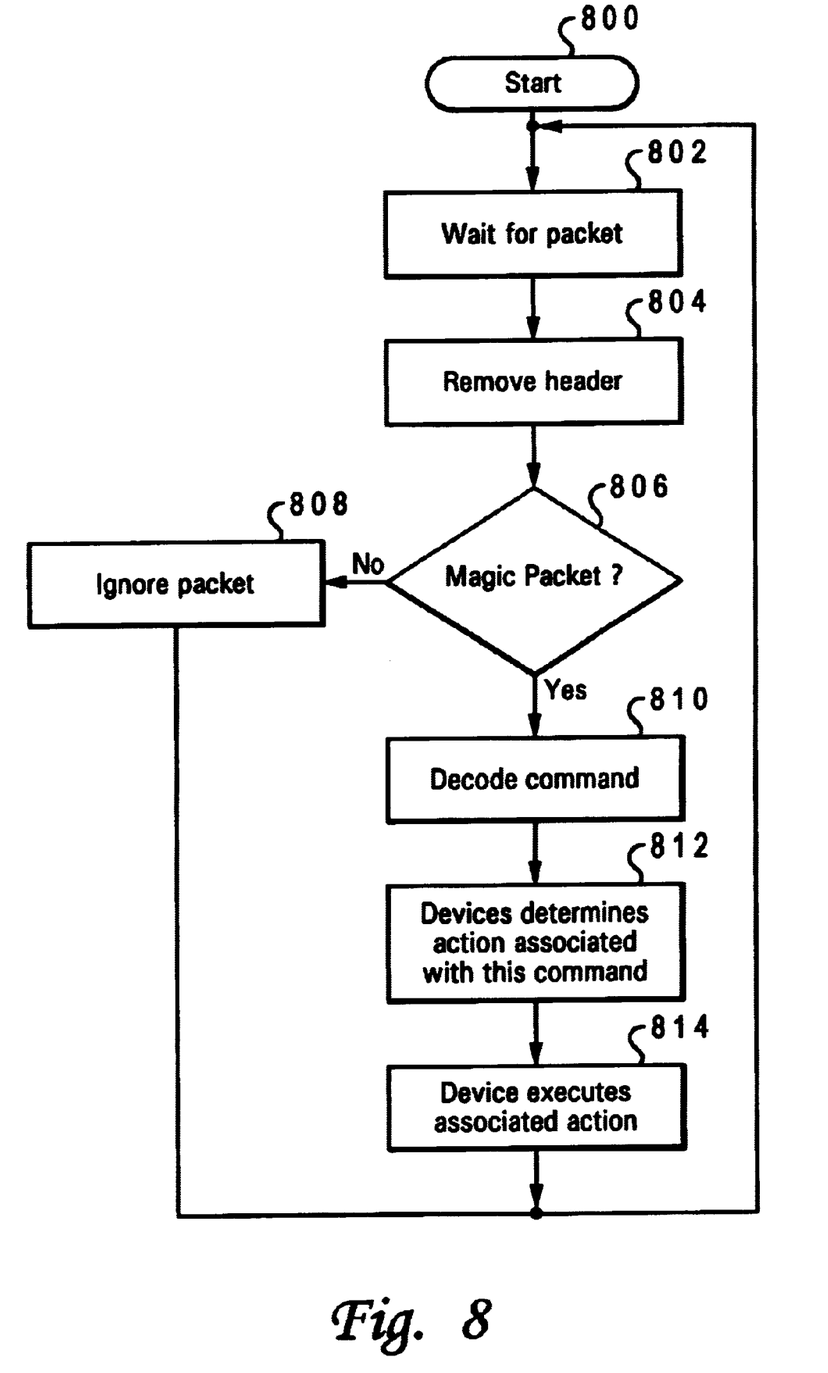
FIG. 8 depicts a high level flow chart which illustrates a dumb device receiving a network packet to a server computer system in accordance with the method and system of the present invention.

FIG. 8 depicts a high level flow chart which illustrates a dumb device receiving a network packet created and transmitted by a server computer system in accordance with the method and system of the present invention. The process starts as depicted by block 800 and thereafter passes to block 802 which illustrates a micro-controller 302 included within device 108 waiting to receive network packet 400. When the packet has been received, physical layer 234 places data packet 404 included within network packet 400 on the MII bus 252A. The MII bus 252 is read by MII interface 312 of ASIC 300. ASIC 300 transfers data packet 404 from MII interface 312 to RX FIFO 310 and to RX buffer 318.

The process then passes to block 804 which depicts micro-controller 302 removing network header 402 from the packet. Thereafter, block 806 illustrates a determination of whether or not this packet includes magic packet 414. If a determination is made that this packet does not include magic packet 414, the process passes to block 808 which depicts ignoring this packet. The process then passes back to block 802.

Referring again to block 806, if a determination is made that this packet includes magic packet 414, the process passes to block 810 which depicts the decoding of the command included within the network packet. Thereafter, block 812 illustrates device 108 determining an action to execute which is associated with the received command. For example, if the device is a door monitor, the command may be to open, close, lock, or unlock the door. Thereafter, block 814 depicts device 108 executing the determined action. The process then passes back to block 802.

Figure 9:
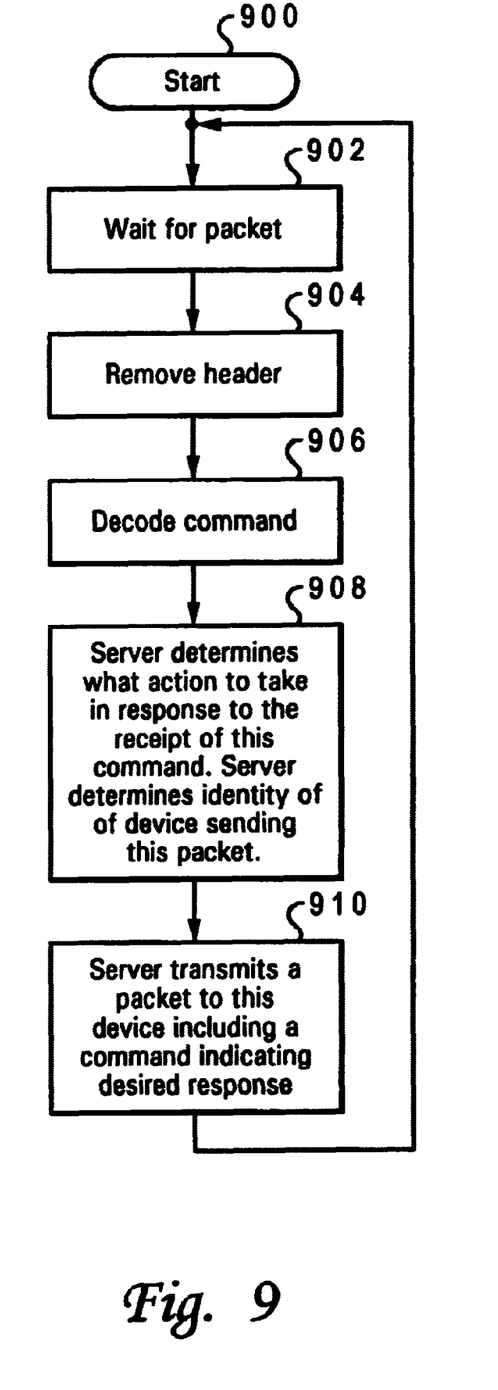
FIG. 9 illustrates a high level flow chart which depicts a server computer system receiving a network packet from a dumb device in accordance with the method and system of the present invention.

FIG. 9 illustrates a high level flow chart which depicts a server computer system receiving a network packet from a dumb device in accordance with the method and system of the present invention. The process starts as depicted by block 900 and thereafter passes to block 902 which illustrates the server computer system waiting to receive a network packet. The process then passes to block 904 which depicts the removal of the network header 402 from the packet. Next, block 906 the decoding of the command 420 included within the packet. Block 908, then, illustrates the server determining what action to take in response to the receipt of this command. The server also determines the identity of the device utilizing field 418. Thereafter, block 910 depicts the server creating and transmitting a packet to this device including a command which indicates the desired response the device should make. The process then passes back to block 902.

While a preferred embodiment has been particularly shown and described, it will be understood by those skilled in the art that various changes in form and detail may be made therein without departing from the spirit and scope of the present invention.

What is claimed is:

1. A method for permiting a dumb device having no operating system to generate and transmit a network packet utilizing a network, said dumb device being coupled to a client computer system utilizing said network, said method comprising the steps of:

establishing a network interface within said dumb device, wherein said network interface includes a network controller and a special purpose processor;

in response to one of a plurality of events, said dumb device generating an associated one of a plurality of internal output signals, wherein each of said plurality of plurality of internal output signals corresponds to a different one of a plurality of commands and wherein said associated internal output signal being received within said dumb device by said network interface;

in response to a receipt of said associated internal output signal at said special purpose processor, said network interface generating and transmitting a network packet including an indication of said event to said client computer system and includes one of said plurality of commands that is associated with said one of said plurality of events, wherein said dumb device having no operating system generates and transmits a network packet, wherein said network packet includes a header packet having an address of said client computer system and a data packet including one of said plurality of commands; and in response to said client computer system receiving said network packet, said client computer system executing a routine associated with said one of said plurality of commands.

2. A system for permitting a dumb device having no operating system to generate and transmit a network packet utilizing a network, said dumb device coupled to a client computer system utilizing said network, comprising:

- a network interface included within said dumb device, wherein said network interface including a network controller and a special purpose processor,
- said dumb device responsive to one of a plurality of events to generate an associated one of a plurality of internal output signals, wherein each one of said plurality of internal output signals corresponds to a different one of a plurality of commands and wherein said associated output signal received by said network interface;
- in response to a receipt of said associated output signal at said special purpose processor, said network interface creates and transmits a network packet including an indication of said event to said client computer system and includes one of said plurality of commands which is associated with said one of said plurality of events, wherein a dumb device having no operating system creates and transmits the network packet, wherein said network packet includes a header packet having an address of said client computer system and a data packet including one of said plurality of commands; and
- in response to said client computer system receiving said network packet, said client computer system executing a routine associated with said one of said plurality of commands.

3. A data processing system including a dumb device having no operating system, and a client computer system, said client computer system coupled to a network, comprising:

- said dumb device including a network interface, said network interface including a network controller and a special purpose processing unit;
- in response to one of a plurality of events, said dumb device generating one of a plurality of output signals;
- said special purpose processing unit receives said one of said plurality of output signals and determines one of a plurality of commands associated with said one of said plurality of output signals;
- said special purpose processing unit executing code for creating a network packet including a header packet including an address of said client computer system and a data packet including said one of said plurality of commands;
- said network controller transmits said network packet to said client computer system; and
- said client computer system executes a routine associated with said one of said plurality of commands.

* * * * *